(12) United States Patent
Thomas

(10) Patent No.: US 10,943,750 B2
(45) Date of Patent: *Mar. 9, 2021

(54) WEATHERPROOF DECORATOR COVER WITH POSITIVE INDICATOR

(71) Applicant: Hubbell Incorporated, Shelton, CT (US)

(72) Inventor: Jason Peter Thomas, Mesa, AZ (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,672

(22) Filed: Jul. 11, 2019

(65) Prior Publication Data
US 2019/0333725 A1 Oct. 31, 2019

Related U.S. Application Data

(63) Continuation of application No. 15/340,086, filed on Nov. 1, 2016, now Pat. No. 10,354,818.

(60) Provisional application No. 62/249,994, filed on Nov. 3, 2015.

(51) Int. Cl.
| | |
|---|---|
| *H01H 23/06* | (2006.01) |
| *H01R 13/52* | (2006.01) |
| *H02G 3/06* | (2006.01) |
| *H01R 24/78* | (2011.01) |
| *H01R 103/00* | (2006.01) |
| *H01H 23/14* | (2006.01) |

(52) U.S. Cl.
CPC .......... *H01H 23/06* (2013.01); *H01R 13/5213* (2013.01); *H02G 3/06* (2013.01); *H01H 23/145* (2013.01); *H01R 24/78* (2013.01); *H01R 2103/00* (2013.01)

(58) Field of Classification Search
CPC .. H02G 3/06; H01R 13/5213; H01R 2103/00; H01R 24/78; H01H 23/145; H01H 23/06
USPC .......... 200/302.1, 302.3, 333, 339, 553, 557
See application file for complete search history.

(56) References Cited

U.S. PATENT DOCUMENTS

| | | |
|---|---|---|
| 2,984,725 A | 5/1961 | Hubbell et al. |
| 3,188,438 A | 6/1965 | Lovasco |
| 3,663,781 A | 5/1972 | Zimmerman et al. |
| 4,843,195 A | 6/1989 | Sato |
| 5,448,028 A | 9/1995 | Filion et al. |
| 5,662,213 A | 9/1997 | Kattler |
| 5,725,086 A | 3/1998 | Cooper |
| 5,811,729 A | 9/1998 | Rintz |
| 6,051,787 A | 4/2000 | Rintz |
| 10,354,818 B2 * | 7/2019 | Thomas ................ H01H 23/06 |
| 2009/0159412 A1 | 6/2009 | Liu |

* cited by examiner

*Primary Examiner* — Edwin A. Leon
*Assistant Examiner* — Lheiren Mae A Caroc
(74) *Attorney, Agent, or Firm* — Wissing Miller LLP

(57) ABSTRACT

A weatherproof switch cover includes a base plate, a rocker arm provided in the base plate and movable between a first position and a second position and a membrane provided below the rocker arm, the membrane providing a weatherproof seal.

20 Claims, 5 Drawing Sheets

WEATHERPROOF DECORATOR COVER WITH POSITIVE INDICATOR

CROSS REFERENCE TO RELATED APPLICATIONS

This application is a continuation of co-pending application Ser. No. 15/340,086, filed Nov. 1, 2016, which claims priority to U.S. Provisional Application Ser. No. 62/249,994 filed Nov. 3, 2015 both of which are incorporated herein by reference in their entirety.

BACKGROUND

Field

The present disclosure relates to switch covers and, more particularly, to weatherproof decorator switch covers with positive indicators.

Description of the Related Art

Weatherproof toggle switches are often used in damp or wet environments. Various ways exist for providing a weatherproof toggle switch. One way is to provide a switch designed and manufactured to include a sealed configuration for preventing condensation or water from entering the switch. Another way is to provide a weatherproof switch plate cover which includes a sealed membrane that covers the forwardly projecting toggle lever. When used in conjunction with the weatherproof switch plate cover, a standard interior toggle switch can be used in damp or wet environments.

Interior wall switches have evolved from simple on/off toggle switches to more attractive décor type switches. Décor type switches include decorator rocker style switches.

Weatherproof switch plate covers exist for use with rocker style switches. However, these covers generally consist of a flat rubber membrane that covers the entire switch. One downside of these covers is that it is not possible to visually determine whether the switch is in the on or off position.

SUMMARY

A weatherproof cover includes a base plate, a rocker arm provided in the base plate and movable between a first position and a second position and a membrane provided below the rocker arm, the membrane providing a weatherproof seal.

A weatherproof cover kit includes a rocker switch adapted for switching electrical power on and off, a weatherproof electrical box in which the rocker switch is to be mounted and a weatherproof switch cover adapted for covering the rocker switch and mountable to the weatherproof electrical box. The weatherproof switch cover includes a base plate, a rocker arm provided in the base plate and movable between a first position and a second position, and a membrane provided below the rocker arm, the membrane providing a weatherproof seal.

A multi-gang weatherproof cover includes a base plate, at least two rocker arms provided in the base plate, each rocker arm movable between a first position and a second position and a membrane provided below the at least two rocker arms, the membrane providing a weatherproof seal.

A multi-gang weatherproof cover includes a base plate, a rocker arm provided in the base plate and movable between a first position and a second position, a flip cover pivotally mounted to the base plate and providing a weatherproof seal and a membrane provided below the rocker arm, the membrane providing a weatherproof seal.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Illustrative embodiments of the present disclosure may be provided as improvements to weatherproof switch covers. For example, a weatherproof switch cover according to an embodiment of the present disclosure allows an decorator type rocker switch to be used in wet or damp environments.

Illustrative embodiments of the present disclosure provide multi-gang weatherproof covers for covering two or more decorator type rocker switches and/or a decorator type rocket switch and a duplex outlet.

According to an embodiment of the present disclosure, a weatherproof switch cover includes a rocker switch mechanism that provides positive tactile feedback to a user when the user moves the switch between the on and off positions.

In certain illustrative embodiments described herein, one or more components of the weatherproof switch cover may be constructed from metal (e.g., stamped steel, spring steel), plastic (e.g., polycarbonate or nylon) or a combination of such materials. Alternatively, steel, galvanized steel, brass, aluminum or other appropriate alloy may be used for the appropriate components. Of course, other types of materials such as other types of plastics, composites, etc. may be used as desired and where appropriate.

In certain embodiments of the present disclosure, a weatherproof switch cover as disclosed herein is mounted to a weatherproof electrical box in which a decorator type rocker switch is provided. The weatherproof electrical box may be a multi-gang box for housing one or more decorator type rocker switches and/or one or more duplex outlets. The weatherproof switch cover as disclosed herein may include one or more rocker arm assemblies for covering one or more decorator type rocker switches and/or one or more weatherproof flip covers for covering one or more standard or decorator type duplex outlets.

Figure 2:
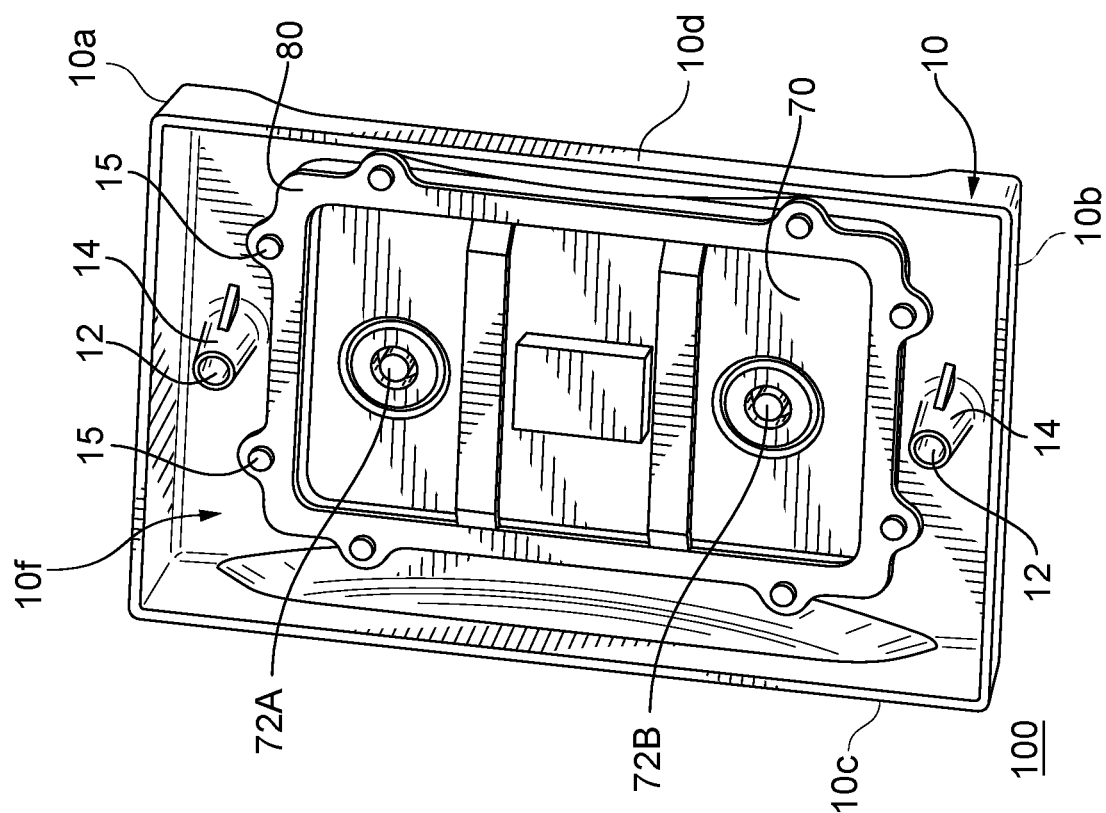
FIG. 2 is a bottom perspective view of the representative weatherproof switch cover according to an illustrative embodiment of the present disclosure.
Figure 1:
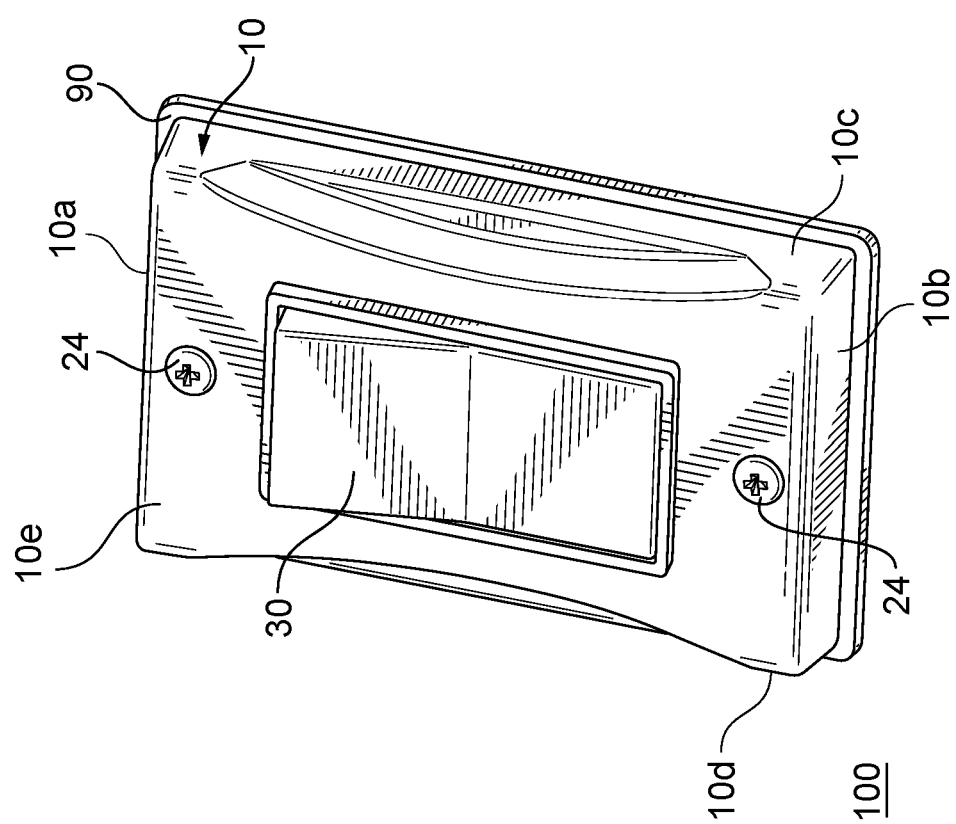
FIG. 1 is a top perspective view of a representative weatherproof switch cover according to an illustrative embodiment of the present disclosure.

A representative weatherproof switch cover according to an embodiment of the present disclosure is shown in FIGS. 1 and 2 and is referred to generally as switch cover 100. According to this embodiment of the present disclosure, switch cover 100 includes a weatherproof rocker arm assembly including a rocker arm 30 mounted to a base plate 10. The base plate 10 includes a top wall 10a, a bottom wall 10b, a pair of side walls 10c and 10d and an exterior surface 10e secured to or integrally molded into the walls. The space within the walls 10a-10d and the exterior surface 10e is an open interior area 10f. A gasket 90 may be removably provided on a back surface of the exterior surface 10e of base plate 10 as will be described later below. Screws 24 extend through holes 12 provided in spacers 14 formed along the upper and lower ends of the base plate 10 such that the screws 24 align with screw holes in a yoke 130 of an electrical device, such as a decorator type rocker style switch 120, as will be described later below. A retainer 80 is secured to base plate 10 using fasteners 15. Retainer 80 holds components of the rocker arm assembly in place. A sealing membrane 70 which includes recessed nubs 72A, 72B provides a weatherproof seal as will be described later below.

Figure 3:
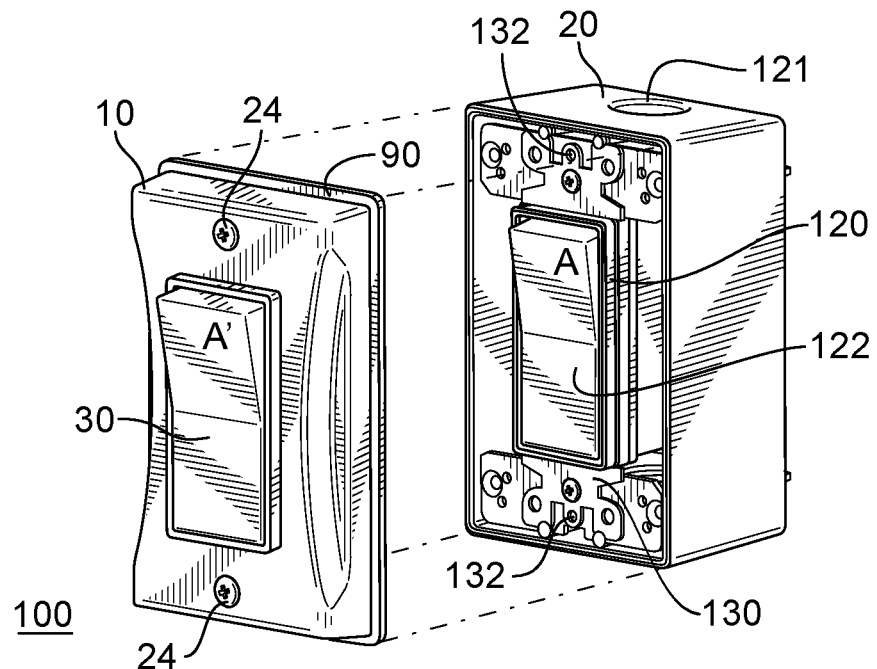
FIG. 3 is side perspective view of a representative weatherproof switch cover according to an illustrative embodiment of the present disclosure and a utility box housing a decorator type rocker style switch.

FIG. 3 depicts a single gang weatherproof electrical box 20 which may be made of metal, plastic, etc. A decorator type rocker style switch 120 is positioned in weatherproof electrical box 20 as shown. Electrical wiring (not shown) is run into electrical box 20 via one or more knockouts 121 and is connected to decorator type rocker style switch 120 in the usual manner. Decorator type rocker style switch 120 includes a rocker arm 122. Generally, switch 120 is arranged such that rocker arm 122 is movable between an "ON" position and an "OFF" position, where the position shown is the "OFF" position. Rocker arm 122 would normally be pressed in area A in order to move rocker arm 122 to the "ON" position. Baseplate 10 of a weatherproof switch cover 100 according to an embodiment of the present disclosure, is positioned over rocker style switch 120 and is secured to weatherproof electrical box 20 such that gasket 90 provides a weatherproof seal between baseplate 10 and an outer edge of weatherproof electrical box 20. Screws 24 which extend through holes 12 in base plate 10 are aligned with screw holes 132 in the yoke 130 of the decorator type rocker style switch 120 for securing base plate 10 to weatherproof electrical box 20. As will be described in more detail below, when weatherproof switch cover 100 is mounted to electrical box 20, pressing rocker arm 30 in area A' will cause switch 120 to move to the "ON" position.

Figure 4:
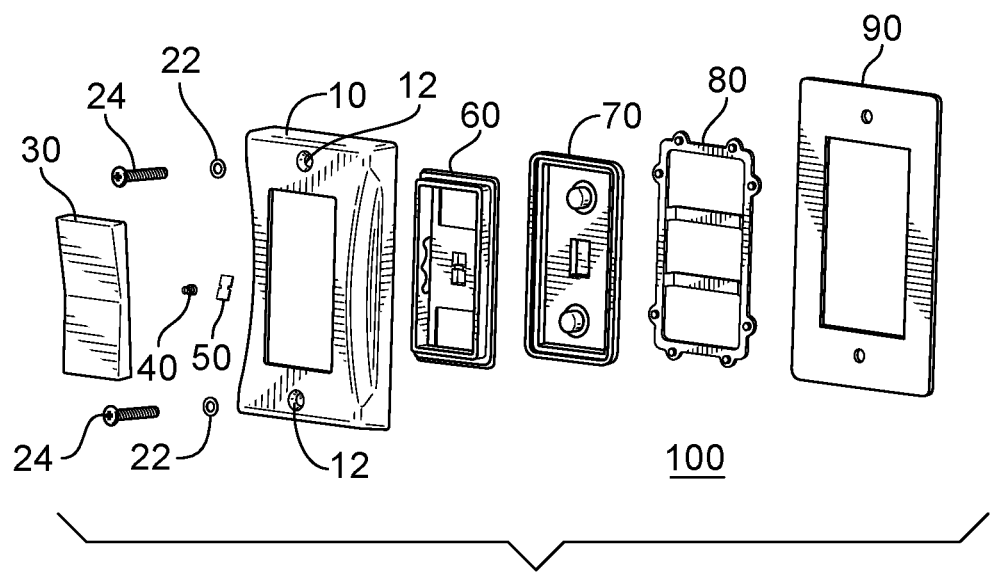
FIG. 4 is an exploded view of a weatherproof switch cover according to an illustrative embodiment of the present disclosure.

An exploded view of switch cover 100 is shown in FIG. 4. A weatherproof rocker arm assembly according to an embodiment of the present disclosure includes rocker arm 30, plunger assembly 40, flipper 50, chassis 60, sealing membrane 70 and retainer 80. The rocker arm assembly is mounted to baseplate 10. As will be described later below with respect to FIG. 5, flipper element 50 cooperates with the plunger assembly 40 for providing a snap like action so that the user can feel the switch switching thus providing tactile feedback to the user. Retainer 80 is secured to the back of base plate 10 to keep the rocker arm assembly together as described above. Sealing membrane 70 and gasket 90 may be made of any suitable weatherproof sealing material including, for example, rubber, neoprene, etc. The spring 42, finger 44, seen in FIG. 5A, and flipper 50 may be made of suitable material such as steel including, for example, spring steel, etc. The other elements of switch cover 100 may be made from metal (e.g., stamped steel), plastic (e.g., polycarbonate or nylon) or a combination of such materials. If the base plate 10 and/or retainer 80 are made of metal, the retainer 80 may be secured to the base plate 10 with fasteners 15, seen in FIG. 2, which may include rivets, screws, a press fit, etc. If the base plate 10 and/or retainer 80 are made of plastic, fasteners 15 may include sonic welds, screws, rivets, etc. Rubber o-rings 22 slip onto screws 24 and provide a weatherproof seal around orifices 12 in base plate 10.

Figure 5A:
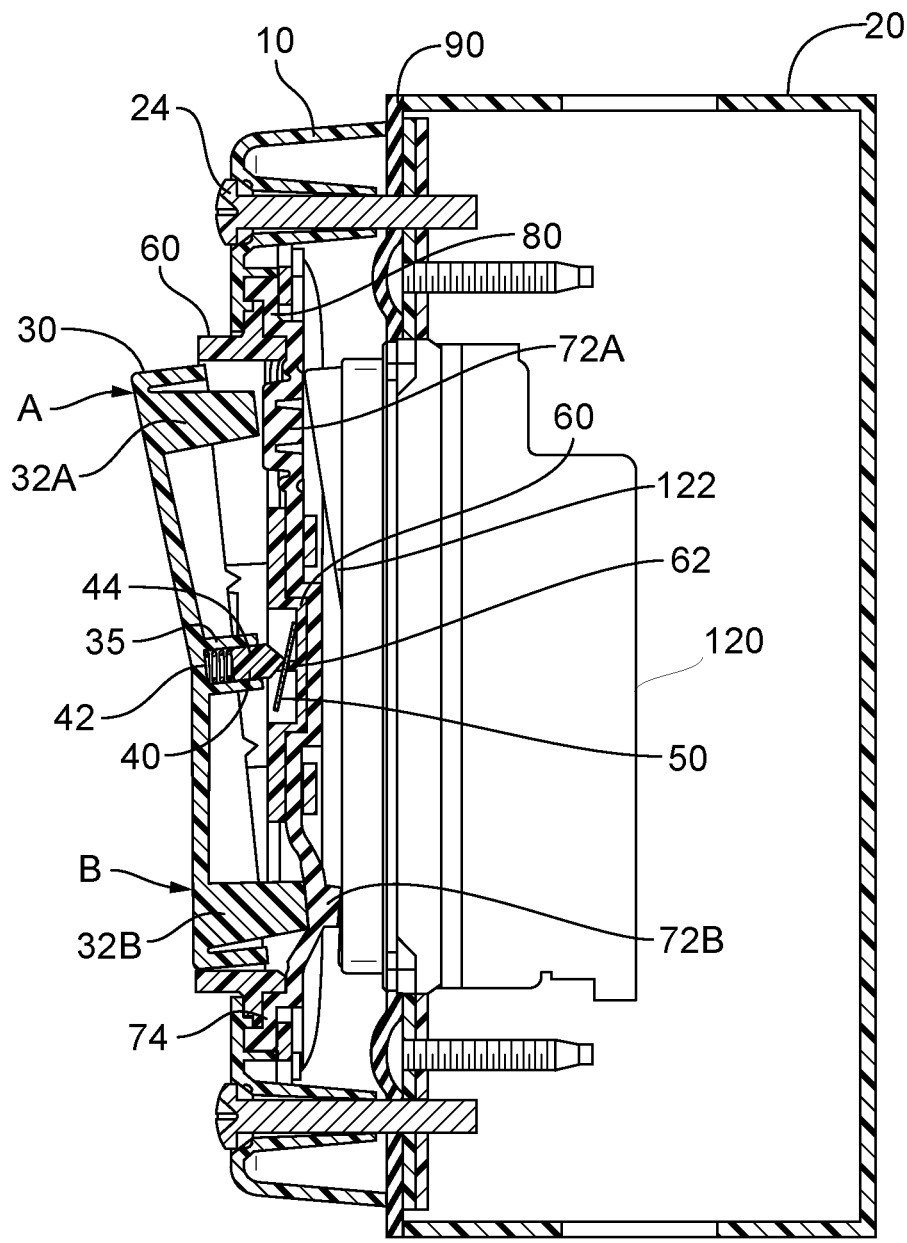
FIGS. 5A and 5B are cross-sectional side views showing how the weatherproof switch cover interacts with a decorator type rocker style switch according to an illustrative embodiment of the present disclosure.
Figure 5B:
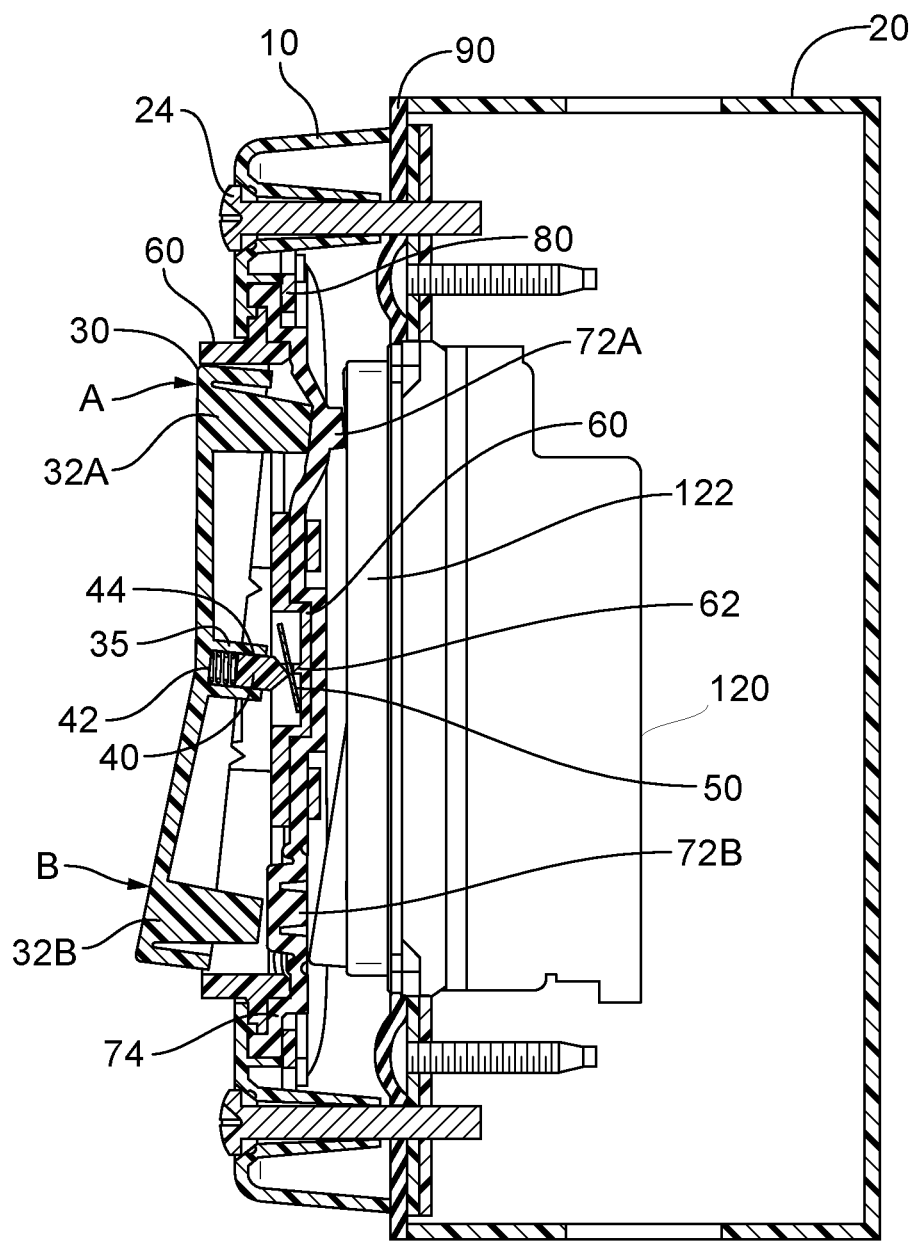

A weatherproof switch cover 100 according to an embodiment of the present disclosure is shown in cross-section in FIGS. 5A and 5B mounted to a utility box 20. Rocker arm 122 is representative of a rocker arm of a decorator type rocker style switch 120 that is mounted to box 20 below weatherproof switch cover 100. For ease of description, the other portions of switch 120 are not shown. Rocker arm 30 includes fingers 32A, 32B located adjacent sealing membrane 70. Sealing membrane 70 includes recessed nubs 72A, 72B. When rocker arm 30 is pressed along section B, rocker arm 30 moves into the position shown in FIG. 5A. In this position, finger 32B urges nub 72B into the rocker switch 122 below such that the rocker switch below will be in, for example, the "OFF" position. When rocker arm 30 is pressed along section A, finger 32A urges nub 72A into the rocker switch 122 below such that the rocker switch 122 moves into, for example, the "ON" position shown in FIG. 5B.

Sealing membrane 70 includes a multi-tiered edge 74. Sealing membrane 70 is sandwiched between carriage chassis 60 and retainer 80 such that retainer 80 presses multi-tiered edge 74 into a correspondingly shaped edge of carriage chassis 60, thus providing a weatherproof seal.

Flipper 50 rests on rocker nub 62 provided on carriage chassis 60. Spring 42 and finger 44 are movably provided in a recess 35 formed on the back of rocker arm 30. Spring 42 urges finger 44 against flipper 50 just above nub 62. As shown in FIG. 5A, flipper 50 is in a first position. When rocker arm 30 is pressed along section A, finger 44 moves such that flipper 50 cams over in the opposite direction into the second position as shown in FIG. 5B. This arrangement provides a positive tactile feel when rocker arm 30 is moved between the "ON" and "OFF" positions.

Figure 6:
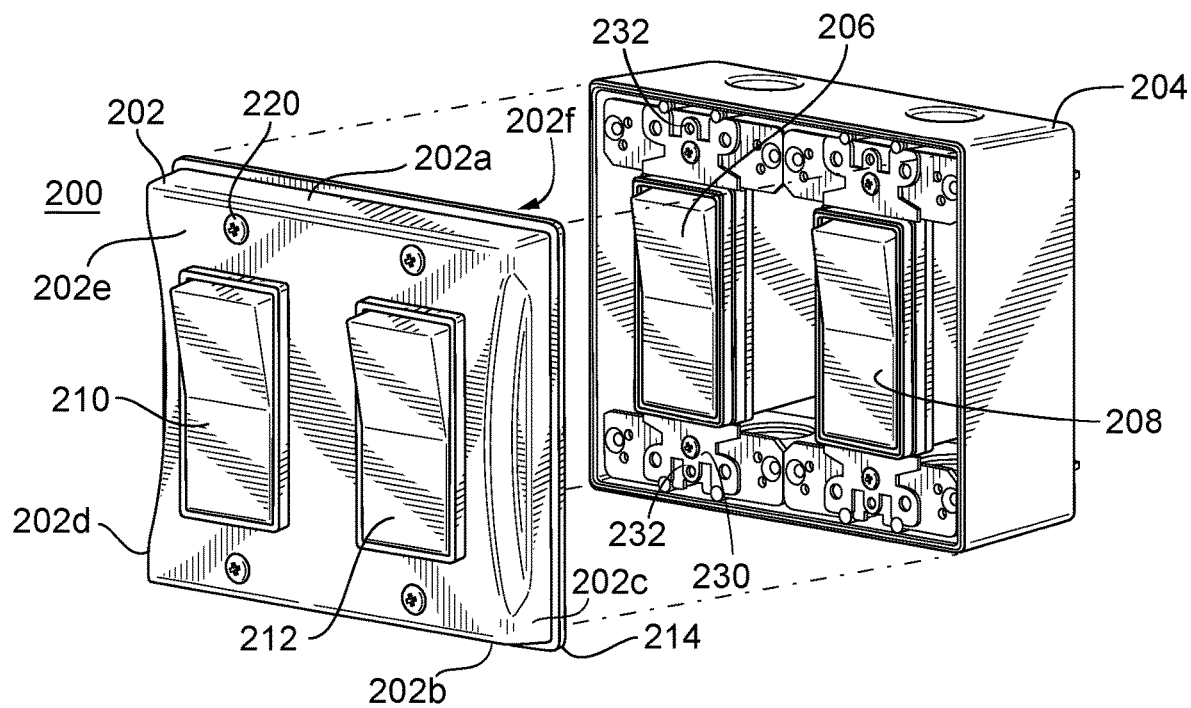
FIG. 6 is a perspective view of a multi-gang weatherproof switch cover for covering two decorator type rocker style switches according to an illustrative embodiment of the present disclosure.

FIG. 6 depicts a duplex weatherproof switch cover 200 according to an embodiment of the present disclosure. According to this embodiment, base plate 202 is dimensioned to cover a 2 gang box 204 housing two decorator type rocker switches 206, 208 as shown. The base plate 202 includes a top wall 202a, a bottom wall 202b, a pair of side walls 202c and 202d and an exterior surface 202e secured to or integrally molded into the walls. The space within the walls 202a-202d and the exterior surface 202e is an open interior area 202f. A gasket 214 is provided between base plate 202 and box 204. One or more weatherproof rocker arm assemblies including rocker arms 210 and 212 are mounted to base plate 202. According to an embodiment of the present disclosure, the rocker arm assemblies are similar to the rocker arm assembly (e.g., single switch) described above with respect to FIG. 4. Of course, instead of providing separate rocker arm assemblies, the components of the rocker arm assembly may be designed and dimensioned for use with the 2 gang weatherproof switch cover 200. Screws 220 align with corresponding holes 232 in the yoke 230 of the decorator type rocker style switches 206, 208.

Figure 7:
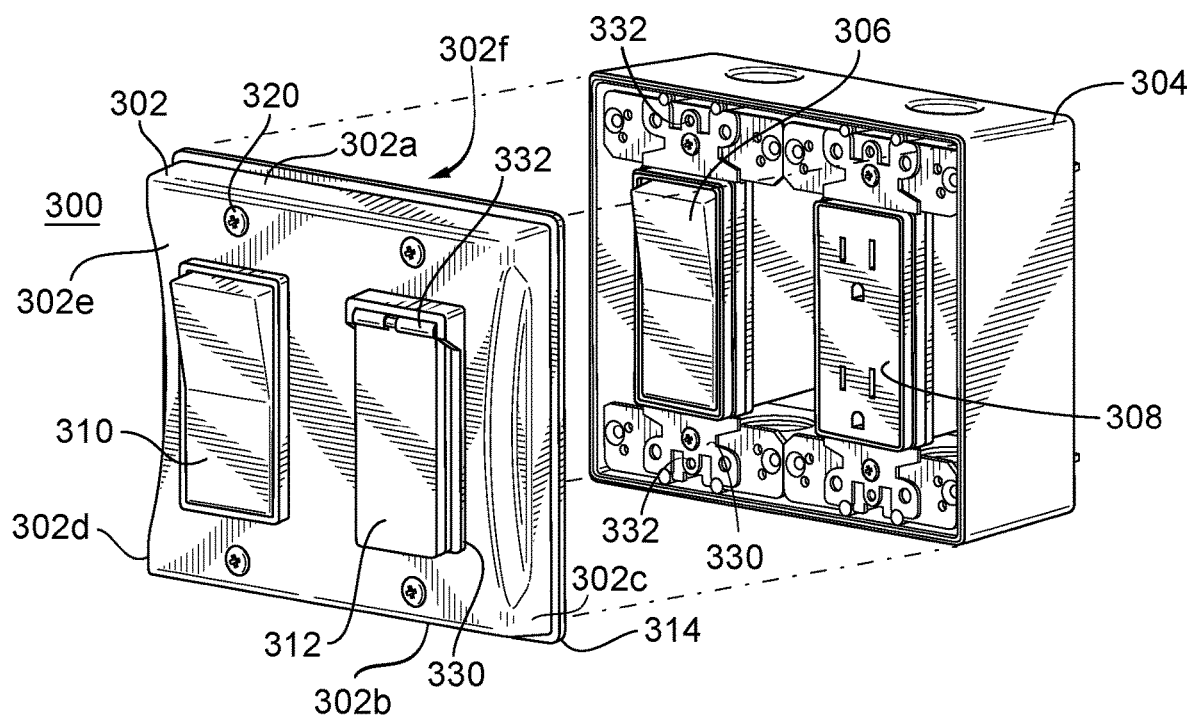
FIG. 7 is a perspective view of a multi-gang weatherproof switch cover for covering a decorator type rocker style switch and a duplex outlet according to an illustrative embodiment of the present disclosure.

FIG. 7 depicts a duplex weatherproof switch/outlet cover 300 according to an embodiment of the present disclosure. According to this embodiment, base plate 302 is dimensioned to cover a 2 gang box 304 housing a decorator type rocker switch 306 and a duplex outlet 308, e.g., a decorator type duplex outlet, as shown. The base plate 302 includes a top wall 302a, a bottom wall 302b, a pair of side walls 302c and 302d and an exterior surface 302e secured to or integrally molded into the walls. The space within the walls 302a-302d and the exterior surface 302e is an open interior area 302f. A gasket 314 is provided between base plate 302 and box 304. A weatherproof rocker arm assembly including rocker arm 310 is mounted to base plate 302. The rocker arm assembly is similar to that described above with respect to FIG. 4. According to this embodiment, a flip cover 312 is pivotally mounted to base plate 302 via a spring biased hinge 332 and provides access to duplex outlet 308. Flip cover 312 includes a gasket 330 providing a weatherproof seal. Screws 320 align with corresponding holes 332 in the yoke 330 of the decorator type rocker style switches 306 and the duplex outlet 308.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A weatherproof switch cover comprising:
   a base plate including top and bottom walls, a pair of side walls, an exterior surface and an open interior area, the exterior surface being secured to or integrally molded into the top and bottom walls and the pair of side walls, the exterior surface having an opening configured to align with an electrical switch;
   an arm associated with the base plate and positioned at least partially within the open interior area and accessible through the opening, the arm being movable between a first position and a second position, wherein when the arm is moved to the first position the arm stays in the first position until the arm is moved to the second position, and when arm is moved to the second position the arm stays in the second position until the arm is moved to the first position; and
   a flexible membrane providing a weatherproof seal between the arm, the opening and the open interior area.

2. The weatherproof switch cover of claim 1, wherein when the arm is moved to the first position a first portion the flexible membrane flexes in a direction away from the arm and when the arm is moved to the second position a second portion the flexible membrane flexes in a direction away from the arm.

3. The weatherproof switch cover of claim 1, further comprising a feedback mechanism providing tactile feedback to a user when the arm is moved between the first and second positions.

4. The weatherproof switch cover of claim 3, wherein the feedback mechanism comprises a spring biased finger movably provided in a center channel of the arm.

5. The weatherproof switch cover of claim 4, wherein the feedback mechanism further comprises a flipper movably provided on a pivot point, wherein the spring biased finger rests on the flipper.

6. A weatherproof electrical kit comprising:
   a weatherproof electrical box; and
   a weatherproof switch cover mountable to the weatherproof electrical box, the weatherproof switch cover comprising:
      a base plate including top and bottom walls, a pair of side walls, an exterior surface and an open interior area, the exterior surface being secured to or integrally molded into the top and bottom walls and the pair of side walls, the exterior surface having an opening configured to align with an electrical switch;
      an arm associated with the base plate and positioned at least partially within the open interior area and accessible through the opening, the arm being movable between a first position and a second position, wherein when the arm is moved to the first position the arm stays in the first position until the arm is moved to the second position, and when arm is moved to the second position the arm stays in the second position until the arm is moved to the first position; and
      a flexible membrane providing a weatherproof seal between the arm, the opening and the open interior area.

7. The weatherproof electrical kit of claim 6, wherein when the arm is moved to the first position a first portion the flexible membrane flexes in a direction away from the arm and when the arm is moved to the second position a second portion the flexible membrane flexes in a direction away from the arm.

8. The weatherproof electrical kit of claim 6, further comprising a feedback mechanism providing tactile feedback to a user when the arm is moved between the first and second positions.

9. The weatherproof electrical kit of claim 8, wherein the feedback mechanism comprises a spring biased finger movably provided in a center channel of the arm.

10. The weatherproof electrical kit of claim 9, wherein the feedback mechanism further comprises a flipper movably provided on a pivot point, wherein the spring biased finger rests on the flipper.

11. A weatherproof switch cover comprising:
    a base plate including top and bottom walls, a pair of side walls, an exterior surface and an open interior area, the exterior surface being secured to or integrally molded into the top and bottom walls and the pair of side walls, the exterior surface having an opening and at least one hole for attaching the base plate to an electrical switch or an electrical box;
    an arm operatively coupled to the base plate within the open interior area and accessible at least partially through the opening, the arm being movable between a first position and a second position, wherein when the arm is moved to the first position the arm stays in the first position until the arm is moved to the second position, and when the arm is moved to the second position the arm stays in the second position until the arm is moved to the first position; and
    a flexible membrane provided within the open interior area, the membrane providing a weatherproof seal between the opening and the open interior area.

12. The weatherproof switch cover of claim 11, wherein the arm comprises a first finger that presses into a first nub provided in the flexible membrane when the arm is moved to the first position, and a second finger that presses into a second nub provided in the flexible membrane when the arm is moved to the second position.

13. The weatherproof switch cover of claim 11, wherein the arm comprises a first finger that presses into the flexible membrane when the arm is moved to the first position, and a second finger that presses into the flexible membrane when the arm is moved to the second position.

14. The weatherproof switch cover of claim 11, further comprising a feedback mechanism providing tactile feedback to a user when the arm is moved between the first and second positions.

15. A weatherproof electrical kit comprising:
a weatherproof electrical box; and
a weatherproof switch cover mountable to the weatherproof electrical box, the weatherproof switch cover comprising:
   a base plate including top and bottom walls, a pair of side walls, an exterior surface and an open interior area, the exterior surface being secured to or integrally molded into the top and bottom walls and the pair of side walls, the exterior surface having an opening and at least one hole for attaching the base plate to an electrical switch or an electrical box;
   an arm operatively coupled to the base plate within the open interior area and accessible at least partially through the opening, the arm being movable between a first position and a second position, wherein when the arm is moved to the first position the arm stays in the first position until the arm is moved to the second position, and when the arm is moved to the second position the arm stays in the second position until the arm is moved to the first position; and
   a flexible membrane provided within the open interior area, the membrane providing a weatherproof seal between the opening and the open interior area.

16. The weatherproof electrical kit of claim 15, wherein the arm comprises at least one finger that presses into nubs provided in the flexible membrane when the arm is moved to the first position and when the arm is moved to the second position.

17. The weatherproof electrical kit of claim 15, wherein the arm comprises at least one finger that presses into the flexible membrane when the arm is moved to the first position and when the arm is moved to the second position.

18. The weatherproof electrical kit of claim 15, wherein the weatherproof switch cover further comprises a feedback mechanism providing tactile feedback to a user when the arm is moved between the first and second positions.

19. A weatherproof multi-gang cover comprising:
a base plate including top and bottom walls, a pair of side walls, an exterior surface and an open interior area, the exterior surface being secured to or integrally molded into the top and bottom walls and the pair of side walls, the exterior surface having at least two openings each configured to align with an electrical switch;
at least two arms associated with the base plate and positioned at least partially within the open interior area, each arm being accessible through one of the openings and movable between a first position and a second position, wherein when the arm is moved to the first position the arm stays in the first position until the arm is moved to the second position, and when arm is moved to the second position the arm stays in the second position until the arm is moved to the first position; and
at least one flexible membrane providing a weatherproof seal between the at least two arms, the at least two openings and the open interior area.

20. A weatherproof multi-gang cover comprising:
a base plate including top and bottom walls, a pair of side walls, an exterior surface and an open interior area, the exterior surface being secured to or integrally molded into the top and bottom walls and the pair of side walls, the exterior surface having at least two openings and at least one hole for attaching the base plate to an electrical switch or an electrical box;
at least two arms operatively coupled to the base plate within the open interior area, each arm being accessible at least partially through one of the opening and movable between a first position and a second position, wherein when the arm is moved to the first position the arm stays in the first position until the arm is moved to the second position, and when the arm is moved to the second position the arm stays in the second position until the arm is moved to the first position; and
at least one flexible membrane provided within the open interior area, the at least one membrane providing a weatherproof seal between the at least two openings and the open interior area.

* * * * *